3,268,476
DYE RECEPTIVE AND LIGHT STABLE POLYOLEFINS CONTAINING CHROMIUM COMPLEXES
Albert S. Matlack, Wilmington, Del., assignor to Hercules Powder Company, Wilmington, Del., a corporation of Delaware
No Drawing. Filed Apr. 1, 1963, Ser. No. 269,750
11 Claims. (Cl. 260—45.75)

This application is a continuation-in-part of application Serial No. 162,979, filed December 28, 1961, now abandoned.

The present invention relates to polyolefin compositions and, more particularly, to polyethylene and stereoregular polymers of propylene and higher α-olefins having improved stability to light and an improved affinity for dyes.

Highly crystalline, high molecular weight polymers of ethylene, propylene, and higher α-olefins are well known and widely used. However, one of the deficiencies of such polymers which must be overcome to enable their use in many applications is poor stability against the deleterious effect of heat and light. Additionally, since such polymers are extremely hydrophobic and resistant to penetration by aqueous solutions or suspensions and since such polymers do not contain functional groups in their structures which can serve as "dye sites" to enable dyestuffs to become firmly attached, it is quite difficult to color or dye such polymers with any of the dyes normally employed for coloring filaments or fabrics.

It is known that polyethylene and stereoregular polymers of propylene and higher α-olefins can be made receptive to metal-complexing dyes by incorporating in the polymer oxides, hydroxides, or sulfates or carboxylic acid salts of certain polyvalent metals. Polymers so modified according to the prior art, however, are still subject to degradation by light and are unsuitable for many applications. It is also known that the polyolefins can be stabilized against degradation by light and simultaneously made receptive to metal-complexing dyes by the addition of certain nickel compounds, e.g., the nickel phenolates of bis(p-alkylphenol) sulfides, sulfoxides, and sulfones. Additionally, it is known that polyolefins can be stabilized against degradation by light by the addition of complex salts of nickel ligands. The complex nickel salts have also been found to improve the receptivity of polyolefins to metal-complexing dyes. However, these nickel compounds often interfere with the obtention of bright and true colors in dyed yarns of the polymers.

In accordance with the present invention, it has been found that these polyolefins can be simultaneously stabilized to light and made more receptive to metal-complexing dyestuffs by incorporating in such polymers a small amount of a complex salt of chromium having the general formula $Cr(ligand)_m X_n$, wherein the ligand function is selected from the group consisting of (1) organic heterocyclic compounds containing a tertiary nitrogen atom and (2) organic compounds containing at least 2 atoms selected from the group consisting of nitrogen and oxygen, at least one of said 2 atoms being nitrogen, said atoms being separated from each other by at least one carbon atom, X is an anion, $m$ is an integer from 1 to 3, and $n$ is a number $3/v$, where $v$ equals the valence of said anion. X, of course, can be the same or different anions when $n$ is greater than 1. The use of these complex chromium salts leads to brighter, truer colors in dyed yarns than in cases where the corresponding nickel salts are used.

Any normally solid polymer of a mono-α-olefin having at least 2 carbon atoms can be treated in accordance with the invention. However, the invention is particularly useful in treating stereoregular polymers of monoolefins having from 3 to 6 carbon atoms, including, for instance, isotactic polypropylene, poly(butene-1), poly(pentene-1), poly(3-methylbutene-1), and poly(4-methylpentene-1). Polyethylene, even though it degrades under the influence of light by a mechanism somewhat different than the above stereoregular polymers, is also susceptible to treatment by the invention.

The complex salts of chromium used as additives in accordance with the invention markedly increase the light stability of polyethylene, stereoregular polypropylene, and related stereoregular polymers. However, certain of these complex salts do not possess sufficient heat stabilizer activity to permit molding or spinning of the polymer under normal operative conditions without embrittlement in the absence of a heat stabilizer. In such cases, slight modification of the molding or spinning conditions or the incorporation of a small amount of a phenolic compound in the polymer will prove beneficial. Although any phenolic compound having antioxidant properties can be used in combination with the complex chromium salt, the invention is particularly useful with polyalkylphenols, alkylidene bis(alkylphenol)s, bis(alkylphenol) sulfides, 2(2'-hydroxyphenyl)-2,4,4-polyalkylchromans, 4(2'-hydroxyphenyl)-2,2,4-polyalkylchromans, and adducts of an alkylphenol and a cyclic terpene. The use of a phenolic compound in addition to the complex salts of chromium is a preferred embodiment of the invention. The presence of the phenolic compound is not necessary for light stability or dyeability reasons. Polymers containing a small amount of the complex chromium salt have been found to have good light stability and receptivity to certain dyestuffs even in the absence of the phenolic antioxidants.

The complex chromium salts which serve as both light stabilizers and dyeing aids in accordance with the invention have the formula $Cr(ligand)_m X_n$, wherein the ligand function is selected from the group consisting of (1) organic heterocyclic compounds containing a tertiary nitrogen atom and (2) organic compounds containing at least 2 atoms selected from the group consisting of nitrogen and oxygen, at least one of said 2 atoms being nitrogen, said atoms being separated from each other by at least one carbon atom, X is an anion, $m$ is 1 to 3, and $n$ is a number $3/v$, where $v$ equals the valence of said anion. They can be made by methods known to the art, as, for example, according to the method of Rollinson and Bailar, Journal of the American Chemical Society 66, 641 (1944), or Wolf and Forberg, Zeitschrift fuer Anorganische und Allgemeine Chemie 268, 327 (1952). A convenient method of preparing the complex chromium salts comprises reacting the desired ligand in a suitable solvent such as methanol, ethanol, or benzene with a solution of the chromium salt containing the desired anion, e.g., chromium stearate, chromium acetate, chromium 2-ethylhexanoate, chromium sulfate, chromium chloride, chromium bromide, chromium thiocyanate, etc.

In the previously assigned formula, the permissible ligand substituents are numerous and varied. Typical compounds that can be used as ligand functions include:

1-(2-hydroxyethyl)-2-undecyl-2-imidazoline,
1-(2-hydroxyethyl)-2-heptadecyl-2-imidazoline,
1-(2-hydroxyethyl)-2-methyl-2-imidazoline,
1-(2-hydroxyethyl)-2-ethyl-2-imidazoline,
1-(2-hydroxyethyl)-2-heptyl-2-imidazoline,
1-(2-hydroxyethyl)-2-pentadecyl-2-imidazoline,
N-[(2-hydroxyethyl)-2-aminoethyl]-dodecanamide,
N-(2-hydroxyethyl)-ethylenediamine,
N-methyl-bis(3-aminopropyl)amine,
1-(2-aminoethyl)-2-methyl-2-imidazolidone,
ethylenediamine,
1,10-diamino-4,7-dioxadecane,
triethanolamine, and
N-methylethanolamine.

Suitable anions include chloride, bromide, hydroxide, oxide, phosphite, p-toluene sulfonate, methane sulfonate, aryl and alkyl phosphonates, molybdate, thiocyanate, cyanide, sulfate, nitrate, phosphate, benzoate, acetate, octanoate, e.g., 2-ethylhexanoate, octadecanoate, propionate, formate, 1,2,3,4-butane tetracarboxylate, polymethacrylate, and the like.

The phenolic compounds used in the preferred embodiment of the invention are also well known. Polyalkylphenols that can be used are either di- or trialkylphenols. Particularly preferred are the 2,4,6-trialkylphenols described in U.S. 2,581,907 to Smith, Jr., et al. Inclusive of such compounds are:

2,4-dimethyl-6-t-butylphenol,
2,4-dimethyl-6-(alpha,alpha,gamma,gamma-tetramethylbutylphenol,
2,6-di-t-butyl-4-methylphenol,
2-methyl-4,6-di-t-butylphenol,
2,6-di-t-butyl-4-sec-butylphenol,
2,4,6-tri-t-butylphenol,
2,4,6-triethylphenol,
2,4,6-tri-n-propylphenol,
2,4,6-triisopropylphenol,
2,6-di-t-octyl-4-propylphenol,
2,6-di-t-butyl-4-ethylphenol,
2,4-dicyclohexyl-6-methylphenol,
2-isopropyl-4-methyl-6-t-butylphenol,
2,4-dimethyl-6-t-amylphenol,
2,4-di-t-amyl-6-methylphenol,
2,6-di-t-butyl-4-isopropylphenol,
2,6-di-t-amyl-4methylphenol,
2,6-di-t-amyl-4-isopropylphenol,
2,4-diisopropyl-6-t-butylphenol, and
2,4-diisopropyl-6-sec-hexylphenol.

The preferred compounds of this class are those which have secondary or tertiary alkyl groups at the 2- and 6-position and a normal alkyl group at the 4-position, a representative of this class being 2,6-di-t-butyl-p-cresol. More preferably, the normal alkyl group in the 4-position is one containing from about 1 to 20 carbon atoms while the secondary or tertiary alkyl groups in the 2- and 6-positions each contain from about 3 to 20 carbon atoms.

The second class of phenolic compound, the alkylidene-bis(alkylphenol), is characterized by the general formula

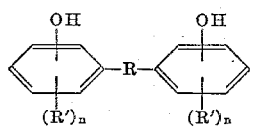

wherein R is an alkylidene radical of 1 to 5 carbon atoms and wherein R' is an alkyl group of 1 to 12 carbon atoms and $n$ is an integer from 1 to 3. When more than one R' substituent is present on a phenyl group, each R' can be the same or different.

Exemplary of these alkylidene-bis(alkylphenol)s that may be used are 2,2'-methylene-bis(5-isopropylphenol),
2,2'-methylene-bis(4-methyl-6-isopropylphenol),
2,2'-methylene-bis(4-methyl-6-t-butylphenol),
2,2'-methylene-bis(4-t-butyl-6-methylphenol),
2,2'-methylene-bis(4,6-di-t-butylphenol),
2,2'-methylene-bis(4-nonylphenol),
2,2'-methylene-bis(4-decylphenol),
4,4'-methylene-bis(2,6-di-t-butylphenol),
2,2'-isopropylidene-bis(5-methylphenol),
4,4'-methylene-bis(2-methyl-6-t-butylphenol),
2,2'-ethylidene-bis(4-methyl-6-t-butylphenol),
2,2'-ethylidene-bis(4,6-di-t-butylphenol),
2,2'-ethylidene-bis(4-octylphenol),
2,2'-ethylidene-bis(4-nonylphenol),
2,2'-isopropylidene-bis(4-methyl-6-isopropylphenol),
2,2'-isopropylidene-bis(4-isopropylphenol),
2,2'-isopropylidene-bis(4-isopropyl-6-methylphenol),
2,2'-isopropylidene-bis(4-methyl-6-t-butylphenol),
2,2'-isopropylidene-bis(4-octylphenol),
2,2'-isopropylidene-bis(4-nonylphenol),
2,2'-isopropylidene-bis(4-decylphenol),
2,2'-isobutylidene-bis(4-methyl-6-t-butylphenol),
2,2'-isobutylidene-bis(4-nonylphenol),
4,4'-butylidene-bis(3-methyl-6-t-butylphenol), etc.

Suitable bis(alkylphenol) sulfides include 4,4'-bis(2-t-butyl-5-methylphenol) sulfide and 2,2'-bis(4-methyl-6-t-butylphenol) sulfide.

The 2(or 4)-(2'-hydroxyphenyl)chromans that may be used are those which have one of the following general formulas:

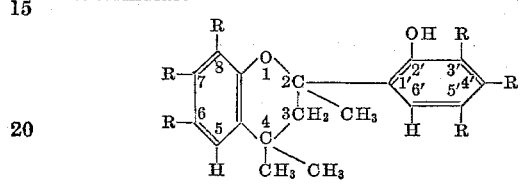

or

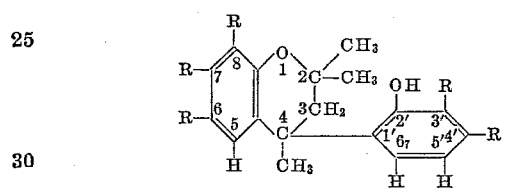

where each R may be hydrogen or alkyl, but at least one R in each of the aromatic rings is alkyl. These compounds may also be named as benzopyrans. Thus, the 2-(2'-hydroxyphenyl)chromans may be named as 2,3-dihydro-2-(2'-hydroxyphenyl)-1,4-benzopyrans or 3,4-dihydro-2-(2'-hydroxyphenyl)-1,2-benzopyrans and the 4-(2'-hydroxyphenyl)chromans may be named as 2,3-dihydro-4-(2'-hydroxyphenyl)-1,4-benzopyrans or 3,4-dihydro-4-(2'-hydroxyphenyl)-1,2-benzopyrans. The 2-(2'-hydroxyphenyl)chromans are also sometimes named as flavans, i.e., 2'-hydroxyflavans. The alkyl substituents in each of the aromatic rings may be any alkyl radical, as, for example, methyl, ethyl, propyl, isopropyl, butyl, isobutyl, tertbutyl, amyl, hexyl, isohexyl, octyl, isooctyl, 2-ethylhexyl, nonyl, isononyl, decyl, undecyl, dodecyl, etc. Preferably at least one alkyl radical in each aromatic ring will contain at least 4 carbon atoms or the sum of the carbon atoms in the alkyl radicals in each ring will be at least 4. Exemplary of these 2(or 4)-(2'-hydroxyphenyl)chromans that may be used in combination with the complex chromium salts are 2-(2'-hydroxyphenyl)-2,4,4,5',6-pentamethylchroman,
4-(2'-hydroxyphenyl)-2,2,4,5',6-pentamethylchroman,
2-(2'-hydroxyphenyl)-5',6-diisopropyl-2,4,4-trimethylchroman,
2-(2'-hydroxyphenyl)-5',6-diisopropyl-2,4,4,3',8-pentamethylchroman,
2-(2'-hydroxyphenyl)-5',6-di-t-butyl-2,4,4-trimethylchroman,
4-(2'-hydroxyphenyl)-5',6-di-t-butyl-2,2,4-trimethylchroman,
2-(2'-hydroxyphenyl)-5',6-dioctyl-2,4,4-trimethylchroman,
2-(2'-hydroxyphenyl)-5',6-dinonyl-2,4,4-trimethylchroman,
4-(2'-hydroxyphenyl)-5',6-dinonyl-2,2,4-trimethylchroman,
2-(2'-hydroxyphenol)-5',6-didecyl-2,4,4-trimethylchroman, etc.

The alkylidene-bis(alkylphenol)s are prepared by any of the well-known procedures of the prior art. Usually, they are prepared by reacting an alkylphenol with formaldehyde, acetaldehyde, acetone, or methyl ethyl ketone, etc., in the presence of a strong acid such as hydrochloric acid, etc. In a similar fashion, the 2-(2'-hydroxyphenyl)-chromans are prepared by reacting an alkylphenol with acetone and the 4-(2'-hydroxyphenyl)chromans are prepared by reacting an alkylphenol with mesityl oxide. Thus, in many of these reactions a mixture of alkylidene-bis(alkylphenol)s and (2'-hydroxyphenyl)chromans is obtained, as, for example, when acetone is condensed or reacted with an alkylphenol the reaction product may be a 2-(2'-hydroxyphenyl)chroman or an isopropylidene-bis-(alkylphenol), depending on the reaction conditions, or the reaction product may be a mixture of these two types of compounds. In such cases, the individual compounds need not be isolated but instead the reaction product may be used with excellent results.

The terpene-phenol adducts that are used in accordance with the invention are known materials that have been described frequently in the prior art.

Generically defined, they are adducts of phenol or an alkylphenol that contains from 1 to 2 alkyl substituents of 1 to 10 carbon atoms each and a cyclic unsaturated terpene or dihydroterpene of empirical compound $C_{10}H_{16}$ or $C_{10}H_{18}$, respectively. They can be prepared by condensing phenol, or an alkylphenol, with the terpene, or dihydroterpene, in varying ratios in the presence of an acidic catalyst.

Suitable cyclic terpenes and dihydroterpenes from which the aforesaid adducts can be made include carvomenthene, dipentene, α-pinene, α-terpinene, terpinolene, 2-menthene, 3-menthene, dihydroterpinolene, dihydrodipentene, camphene, $\Delta^3$-carene, β-pinene, and the like. Suitable phenols, in addition to phenol itself, include the various isomeric cresols, 2,4-xylenol and other isomeric xylenols, p-sec-butylphenol, p-isopropylphenol, o-isopropylphenyl, m-isopropylphenol, o,o'-diisopropylphenol, o,o'-di-t-butylphenol, o-amylphenol, o-nonylphenol, and similar compounds.

The two reactants can be condensed in varying ratio. Any ratio within the range of 0.3 to 3 moles of terpene or dihydroterpene per mole of the phenolic compound is satisfactory, but it is preferred to employ a ratio within the narrower range of 0.5 to 2.5 moles of terpene or dihydroterpene per mole of the phenolic compound.

The adduct formation is carried out by contacting the two reactants in the presence of an acid catalyst at a temperature within the range of about 0 to 150° C. and allowing the reaction to proceed. An inert solvent may be used as a reaction medium for convenience, if so desired. Normally, the reaction will go to substantial completion in from 1½ to 5½ hours. Upon termination of the reaction, unconsumed reactants and volatile by-products can be removed by distillation at reduced pressure since the adducts themselves are high boiling materials.

The said catalyst can be of any of those acids or acidic compounds that are useful catalysts in any condensation reactions generally. These include mineral acids such as sulfuric acid, organic acids such as p-toluene sulfonic acid, boron trifluoride and its derivatives, as, for instance, complexes of boron trifluoride and an ether, e.g., boron trifluoride-ethyl ether complex, metal chlorides such as aluminum chloride and stannic chloride, and acidic clays.

The terpene-phenol adducts are in all cases not a simple chemical compound but rather a mixture of compounds, principally phenolic ethers and terpenylated phenol. Thus, for instance, the adduct of 2 moles of camphene and 1 mole of p-cresol is a mixture of compounds, in which mixture the principal ingredient is di-isobornyl-p-cresol (the isobornyl radical being formed by isomerization of camphene) but which also contains lesser amounts of the isobornyl ether of p-cresol.

In the case of other terpenes, or dihydroterpenes, and other phenols, similar adducts are formed in which the proportion of ingredients will vary depending on the ratio of reactants and the catalyst employed. Consequently, the adducts employed in the invention are incapable of structural definition.

The amount of the complex chromium salt incorporated in the polyolefin can be varied from a very small amount up to several percent. More specifically, beneficial results are normally obtained when it is employed in an amount from about 0.1 to about 5%, based on the weight of the polymer.

As previously mentioned, one of the preferred, but optional, embodiments of the invention comprises incorporating into the polymer a phenolic compound in addition to the complex chromium salt. The phenolic compound, when used, preferably comprises from about 0.01 to about 5% by weight of the polymer.

The additives used in accordance with this invention may be admixed with the polyolefin by any of the usual procedures for incorporating an additive into a solid material. A simple method is to dissolve the additives in a low boiling solvent such as benzene or hexane and, after thoroughly mixing the solution with the polymer in flake or other such form, evaporating the solvent; or they may be incorporated by various mechanical means such as mixing, etc.

In addition to the complex chromium salt and the phenolic compound, there may also be present compounds capable of decomposing peroxides, ultraviolet light absorbers, phosphites, antacids such as calcium soaps, or other antioxidants. Other materials may also be incorporated in the polymer, as, for example, pigments, fillers, etc.

The following examples will illustrate the degree of stabilization and dyeability that is obtained when a polyolefin is treated in accordance with this invention. The term "RSV" as used herein denotes reduced specific viscosity, which is the specific viscosity divided by concentration of a 0.1% weight/volume solution of polymer in decahydronaphthalene at 135° C. All parts and percentages are by weight unless otherwise stated, and the percentage of stabilizer is based on the weight of polymer.

*Examples 1–11*

Stereoregular polypropylene having a birefringent melting point of about 168° C. and a reduced specific viscosity of 4.0 was thoroughly blended with 0.4% calcium stearate (an extrusion aid), 0.5% of various of the complex chromium salts described by the invention, and 0.5% of the reaction product of 2 moles of nonylphenol and 1 mole of acetone, the reaction product (hereinafter referred to as NP-A-RP) comprising a mixture of isopropylidene-bis(nonylphenol) and 2-(2'-hydroxyphenyl)-2,4,4-trimethyl-5,6-dinonylchroman. The blend was extruded into molding powder at 210° C., and the molded product was then pressed into sheets 25 mils thick. Strips cut from these sheets and 0.5 inch wide were fastened onto pieces of white cardboard and exposed to outdoor weathering in southern Florida at a 45° angle facing south. During the outdoor exposure, the development of brittleness in each strip was observed by periodically folding to an angle of 180° and noting any change taking place on the fold line. The following rating schedule was used to evaluate the degree of brittleness:

(1) Unchanged from original condition
(2) Slight surface crazing on fold
(3) Shallow cracks on fold
(4) Breaks in cheesy manner, but pieces hang together; considered failure
(5) Brittle break; failure Table I shows the outdoor exposure rating for each of these compositions.

TABLE I

| Example | Cr(ligand)$_m$X$_n$ | | | Rating After Florida Exposure | |
|---|---|---|---|---|---|
| | Ligand | m | X$_n$ | Rating | Langleys |
| Control | (Contains heat stabilizer but no complex chromium salt) | | | 5 | 10,000 |
| 1 | C$_{11}$H$_{23}$–C(=N–)(N(CH$_2$CH$_2$OH)–) (amidine with N-CH$_2$CH$_2$OH) | 2 | (Acetate)$_3$ | 1–2 | 20,000 |
| 2 | NH$_2$CH$_2$CH$_2$NHCH$_2$CH$_2$OH | 2 | (Acetate) (2-ethyl hexanoate)$_2$ | 2–3 | 30,000 |
| 3 | NH$_2$CH$_2$CH$_2$NH$_2$ | 2 | (Acetate) (2-ethyl hexanoate)$_2$ | 2 | 20,000 |
| 4 | CH$_3$N(CH$_2$CH$_2$CH$_2$NH$_2$)$_2$ | 2 | (Acetate) (2-ethyl hexanoate)$_2$ | 2 | 20,000 |
| 5 | NH$_2$CH$_2$CH$_2$NH$_2$ | 3 | (Acetate) (2-ethyl hexanoate)$_2$ | 2 | 20,000 |
| 6 | C$_{11}$H$_{23}$–C(=N–)(N(CH$_2$CH$_2$OH)–) | 1 | (Acetate)$_3$ | 2 | 20,000 |
| 7 | NH$_2$(CH$_2$)$_3$OCH$_2$CH$_2$O(CH$_2$)$_3$NH$_2$ | 1 | (Acetate) (2-ethyl hexanoate)$_2$ | 3 | 20,000 |
| 8 | N(CH$_2$CH$_2$OH)$_3$ | 1 | (Acetate) (2-ethyl hexanoate)$_2$ | 3 | 20,000 |
| 9 | C$_{11}$H$_{23}$–C(=N–)(N(CH$_2$CH$_2$OH)–) | 2 | (Thiocyanate)$_3$ | 2 | 20,000 |
| 10 | CH$_3$NHCH$_2$CH$_2$OH | 2 | (Acetate) (2-ethyl hexanoate)$_2$ | 3 | 20,000 |
| 11 | CH$_3$–C(=N–)(N(CH$_2$CH$_2$NH$_2$)–) | 2 | (Acetate) (2-ethyl hexanoate)$_2$ | 3 | 20,000 |

*Example 12*

Example 2 was repeated except that the composition did not contain the reaction product of nonylphenol and acetone. In this example the embrittlement time was determined in a Fadeometer by periodically examining strip and noting the time elapsed until it became brittle, the embrittlement point being the time (in days) elapsed until a strip breaks when bent double. Table II shows the exposure data for the composition.

TABLE II

| | Embrittlement time (days) |
|---|---|
| Control | 1 |
| Example 12 | 6 |

*Examples 13–15*

Polyethylene having a density of 0.96 was blended with 0.5% of various of the complex chromium salts described by the invention in the manner of Examples 1–11, except that extrusion was at 199° C. and the embrittlement time was determined in a Fadeometer in the manner of Example 12. Table III shows the exposure data for each of these compositions.

*Examples 16–17*

Compositions were prepared by blending the polymer of Examples 1–11 with 0.5% of bis[N-(2-hydroxyethyl) ethylenediamine] chromium (III) acetate bis(2-ethyl hexanoate) (Example 16) or bis[N-methyl-bis(3-aminopropyl)amine] chromium (III) acetate bis(2-ethyl hexanoate) (Example 17) and 0.5% of a mixture of 4,4'-n-butylidene-bis(2-t-butylphenol) and diphenyl iso-octyl phosphite, the mixture containing one part of the phenol per 2.5 parts of the phosphite and having been heated at elevated temperature according to the procedure of Belgian 604,245 in order to improve compatibility of the two compounds with the polymer. The compositions were each melt spun at 250–270° C. and drawn into yarn (210 denier, 35 filaments). The yarn was knit into fabric and samples of the fabric exposed to outdoor weathering in Miami, Florida, half of the samples being scoured for 30 minutes at 50–60° C. at a 40/1 liquor/fiber ratio by weight in a 1 gram per liter aqueous solution of sodium dodecyl benzene sulfonate, an anionic detergent, prior to exposure. The stability of each composition was determined by measuring the tenacity and elongation after 10,000 Langleys of exposure (approximately ¾ of a month, depending upon cloud cover and time of year). Test results are presented in Table IV.

TABLE III

| Example | Cr(ligand)$_m$X$_n$ | | | Embrittlement Time (days) |
|---|---|---|---|---|
| | Ligand | m | X$_n$ | |
| Control | (Contains no complex chromium salt) | | | 7 |
| 13 | NH$_2$CH$_2$CH$_2$NHCH$_2$CH$_2$OH | 2 | (Acetate) (2-ethyl hexanoate)$_2$ | 19 |
| 14 | NH$_2$CH$_2$CH$_2$NH$_2$ | 2 | (Acetate) (2-ethyl hexanoate)$_2$ | 14 |
| 15 | CH$_3$N(CH$_2$CH$_2$CH$_2$NH$_2$)$_2$ | 2 | (Acetate) (2-ethyl hexanoate)$_2$ | 17 |

TABLE IV

| Example | Original Tenacity (grams/denier) | | Tensile Retention (Percent) | | Original Elongation (Percent) | | Elongation Retention (Percent) | |
|---|---|---|---|---|---|---|---|---|
| | NS | S | NS | S | NS | S | NS | S |
| Control | 5.11 | 5.25 | 13 | 10 | 34.3 | 33.6 | 11 | 9 |
| 16 | 4.33 | 4.41 | 59 | 56 | 37.5 | 42.0 | 36 | 29 |
| 17 | 4.42 | 4.72 | 58 | 74 | 39.5 | 47.0 | 50 | 36 |

NS = not scoured.   S = scoured.

*Examples 18–23*

In these examples yarns (6 denier per filament) were melt spun from the stereoregular polypropylene of Example 1, blended with 0.5% of bis[1-(2-hydroxyethyl)-2-undecyl-2-imidazoline] chromium (III) acetate, 0.1% NP-A-RP and 0.25% dilaurylthiodipropionate, and fabric in the form of tubing was knit from 210 denier, 35 filament yarn having the following physical properties:

Tenacity _____ grams per denier__ 6.25
Elongation at break _____ percent__ 35.8
Free shrinkage in boiling water _____ do____ 2.5

Fabric was also prepared in the same way from a polymeric blend of the same polypropylene with the NP-A-RP and the dilaurylthiodipropionate, but no complex chromium salt of the imidazoline. The fabrics were scoured for 30 minutes at 50–60° C. at a 40/1 liquor/fiber ratio by weight in a 1 gram per liter aqueous solution of sodium dodecyl benzene sulfonate, an anionic detergent. The scoured, wet fabric specimens were introduced into a dye bath at room temperature, whereupon the dye bath was heated to boiling in 30 to 40 minutes with continuous stomper agitation, and boiling and agitation were continued for 3 hours. The dyed fabrics were rinsed in water, and then scoured in a scouring bath containing 2 grams per liter of sodium carbon and 5 grams per liter of soap in the ratio of 40/1, scouring bath/fiber, by weight for 30 minutes at 60° C. The dyed fabrics were then rinsed and air dried at room temperature.

The dye baths for these examples were prepared as follows:

Ratio of dye liquor to fiber (by weight) _____ 40/1
Emulsifier (sodium dodecyl benzene
 sulfonate) _____ percent (o.w.f.)__ 1
Acetic acid _____ do____ 2
Dye _____ do____ 0.3 to 2

O.w.f. = based on weight of fiber

The dye in each case was added to the dye bath in the form of a concentrated aqueous dispersion of dye particles.

In these examples the dyed fabric specimens did not lose color when rescoured for 30 minutes at 60° C. in the above post-dyeing scouring liquor. Moreover, the dyed fabric specimens in all these examples did not lose color when extracted for 2 hours at room temperature with agitation in perchloroethylene, or for 30 minutes at 46° C. in perchloroethylene. No crocking occurred when the dyed fabric specimens were tested either wet or dry, and microscopic examination of cross sections of all dyed specimens showed deep penetration of all of the respective dyes into the yarn.

Table V following lists pertinent data with respect to the structural formula of the dye used in each example, color of dyed fabric, and color stability of dyed fabric subjected to Fadeometer exposure. The control for each example contained 0.1% NP-A-RP and 0.25% dilaurylthiodipropionate but no bis[1 - (2 - hydroxyethyl) - 2-undecyl-2-imidazoline] chromium (III) acetate.

| Example No. | Structural Formula of Dye Molecule | Color of Dyed Fabric | Color Stability on Fadeometer Exposure for 20 Hours |
|---|---|---|---|
| 18 | $O_2N$—⌬(OH)(Cl)—N=N—⌬⌬(HO) | Dark violet-blue | Slight break. |
| Control | $O_2N$—⌬(OH)(Cl)—N=N—⌬⌬(HO) | Lavender | Stripped of color. |
| 19 | ($O_2N$)($O_2N$)⌬(OH)—N=N—⌬(OH)($CH_3$) | Dark Brown | Very slight break. |
| Control | ($O_2N$)($O_2N$)⌬(OH)—N=N—⌬(OH)($CH_3$) | Brown | Severe break. |

| Example No. | Structural Formula of Dye Molecule | Color of Dyed Fabric | Color Stability on Fadeometer Exposure for 20 Hours |
|---|---|---|---|
| 20 | 1,2,3-trihydroxyanthraquinone | Brown | Very slight break. |
| Control | 1,2,3-trihydroxyanthraquinone | Red-brown | Severe fading. |
| 21 | 2-carboxyphenyl-azo-1-naphthol | Orange-red | No break. |
| Control | 2-carboxyphenyl-azo-1-naphthol | Coral | Slight break. |
| 22 | 2-carboxyphenyl-azo-(3-hydroxy-1-(3-chlorophenyl)-5-methylpyrazole) | Yellow | No break. |
| Control | 2-carboxyphenyl-azo-(3-hydroxy-1-(3-chlorophenyl)-5-methylpyrazole) | Light yellow | Slight fading. |
| 23 | 2,4-dichloro-6-hydroxyphenyl-azo-(8-hydroxy-5-acetamidonaphthyl) | Dark grey-blue | Slight break. |
| Control | 2,4-dichloro-6-hydroxyphenyl-azo-(8-hydroxy-5-acetamidonaphthyl) | Grey-blue | Completely stripped. |

Example 24

The procedure of Examples 18–23 was repeated using the polymeric blend of Example 1 and the dye of Example 20. The fabric was dyed a dark violet-blue and showed a slight break after exposure in the Fadeometer for 20 hours.

Example 25

Stereoregular polypropylene having a birefringent melting point of about 168° C. and a reduced specific viscosity of 4.0 was thoroughly blended on a 2-roll mill with 0.5% of bis[1-(2-hydroxyethyl)-2-undecyl-2-imidazoline] chromium (III) acetate, 0.25% dilaurylthiodipropionate and 0.1% NP-A-RP. The polymeric blend was then pressed into film 5–7 mils thick at 205–215° C. A strip 1.5 inches wide and 3 inches long was cut from this film and rinsed with dilute nonionic detergent solution (1 gram per liter aqueous solution of a nonionic nonylphenol-ethylene oxide adduct containing 63% combined ethylene oxide based on the weight of the nonylphenol) at 55–60° C. to remove surface contaminants. A strip of film was also prepared in the same way from a polymeric blend of the same polypropylene with the dilaurylthiodipropionate and NP-A-RP but no complex chromium salt of the imidazoline.

A dye bath solution was prepared from 200 parts water, 1 part 50% acetic acid, 0.01% nonionic detergent (nonylphenol-ethylene oxide adduct), by weight of the fiber, and 1% CI mordant red 19 (CI 18735). The dye bath was heated to 50° C., the film strips immersed in the bath, the bath heated to the boil in about ½ hour, and held at a gentle boil for 1 hour. The film strips were then removed and rinsed in warm water. The film strip containing the complex chromium imidazoline salt was dyed a light red; the film strip which contained no chromium salt was not dyed. The dyed strip did not lose color when scoured or when extracted with perchloroethylene.

*Examples 26–32*

The procedure of Examples 18–23 was repeated using the polymeric blends of Examples 2–5 and 7–8 and the dye of Example 23. Fabric from each was dyed a dull brown and showed slight break after exposure in the Fadeometer for 20 hours.

*Examples 33–37*

Dyed fabrics were prepared according to the procedure of Examples 18–23 using a polymeric blend of the polypropylene of Examples 1–11, 0.75% of the complex chromium salt of Example 1, and 0.1% NP-A-RP. Dyed fabric was also prepared in the same way from a similar polymeric blend containing 0.75% of the corresponding complex nickel salt in place of the chromium salt. Table VI following lists pertinent data with respect to the structural formula of the dye used in each example, general color, and a notation of the color of the dyed fabric according to the Munsell system of color which measures the three attributes of color known in the system as hue, value, and chroma, as compared with Munsell color standards, and color stability of the fabric after subjection to Fadeometer exposure. In the Munsell system, the hue notation of color indicates its relationship to Red, Yellow, Green, Blue, and Purple; the value notation indicates its lightness; and the chroma notation indicates its strength (or departure from Neutral). In recording a color by Munsell notation, the symbol for hue is written first and is followed by a symbol written in fraction form, the numerator indicating the value and the denominator indicating the chroma (H V/C). The measure of a given color sample, then, is the Munsell notation of its position in relation to the standard in Munsell Book of Color, Munsell Color Company, Inc., Baltimore, Maryland (1929–1960). Evaluation of color stability after Fadeometer exposure was made by noting the change in shade using the International Grey Scale rating where 5=no change
4=noticeable change
3=moderate change
2=severe change
1=very severe change
(0)=completely stripped of color In the table, the letter A following the example number denotes fabrics prepared from blends containing the complex chromium salts and B denotes fabrics from blends containing the corresponding nickel salts.

TABLE VI

| Example No. | Structural Formula of Dye Molecule | General Color of Dyed Fabric | Munsell Value (H V/C) | Color Stability on Fadeometer Exposure | |
| --- | --- | --- | --- | --- | --- |
| | | | | For 20 Hours | For 40 Hours |
| 33A 33B | 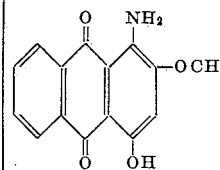 | Violet Pink | 5P 5/8 10RP 8/8 | 4 1 | |
| 34A 34B | 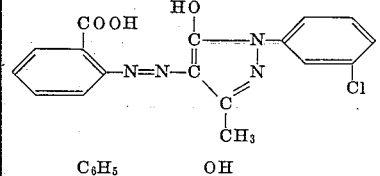 | Yellow do | 5Y 8/10 5Y 8/10 | 4 5 | 3 4 |
| 35A 35B | 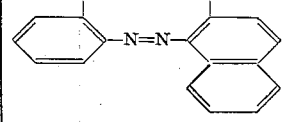 | Brown orange do | 7.5R 5/10 10R 6/10 | 5 3 | 4 2 |
| 36A 36B | 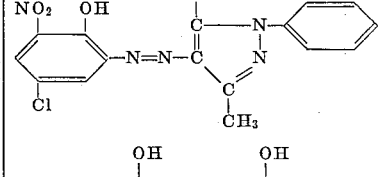 | Red Violet red | 2.5R 4/10 10RP 5/10 | 2 3 | 1 |
| 37A 37B | 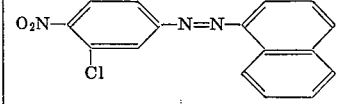 | Grey blue Violet | 7.5PB 6/6 7.5P 6/4 | 4 2 | 3 |

EXAMPLES 38-40

Dyed fabrics were prepared according to the procedure of Examples 33-37 using a polymeric blend of the polypropylene of Examples 1-11, 0.4% calcium stearate, 0.5% of the mixture of 4,4'-n-butylidene-bis(2-t-butylphenol) and diphenyl isooctyl phosphite of Examples 16-17 and (Example 38) 0.5% of the chromium ligand of Example 4, (Example 39) 1.0% of the chromium ligand of Example 3, and (Example 40) 0.5% of the chromium ligand of Example 2, using various dyestuffs. Table VII following lists pertinent data with respect to the dyestuffs employed, general color, Munsell notation, and color stability of the dyed fabrics, the dyestuffs being designated by letters A (C) 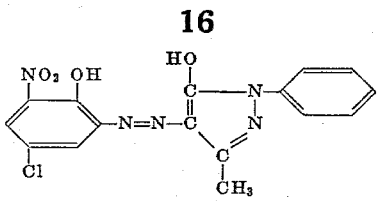

(D) 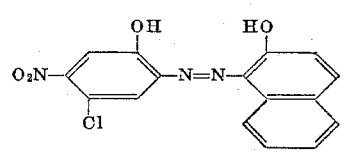

TABLE VII

| Dye | Example 38 | | Color Stability on Fadeometer Exposure | | Example 39 | | Color Stability on Fadeometer Exposure | | Example 40 | | Color Stability on Fadeometer Exposure | |
|---|---|---|---|---|---|---|---|---|---|---|---|---|
| | Color | Munsell | 20 Hours | 40 Hours | Color | Munsell | 20 Hours | 40 Hours | Color | Munsell | 20 Hours | 40 Hours |
| (A) | Y | 5Y 8/10 | 1 | | Y | 5Y 8/10 | 2 | | Y | 5Y 8/10 | 4 | 3 |
| (B) | RB | 10R 6/8 | 3 | 2 | RB | 10R 6/8 | 3 | 2 | RB | 7.5R 4/6 | 4 | 3 |
| (C) | R | 10RP 6/10 | 1 | | R | 10RP 6/10 | 2 | | R | 10RP 5/10 | 1 | |
| (D) | GB | 7.5PB 6/4 | 2 | | GB | 7.5PB 6/4 | 4 | 3 | B | 7.5PB 4/6 | 5 | 4 |

Y=Yellow. RB=Red brown. R=Red. GB=Grey blue. B=Blue.

to D and denoting dyestuffs having the following structural formulas:

(A)

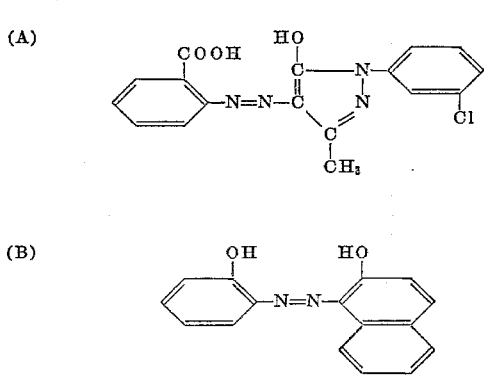

(B)

EXAMPLES 41-47

Dyed fabrics were prepared according to the procedure of Examples 18-23 using a polymeric blend containing the polypropylene of Example 1, 1% bis[1-(2-hydroxyethyl)-2-undecyl-2-imidazoline] chromium (III) acetate, 0.1% NP-A-RP, and 0.25 dilaurylthiodipropionate. Table VIII following lists pertinent data with respect to the structural formula of the dye used in each example and color of the dyed fabrics before and after Fadeometer exposure according to the procedure of Examples 33-37, as compared with dyed fabrics prepared in the same manner from a similar polymeric blend containing 0.5% of the nickel phenolate of bis(p-1,1,3,3-tetramethylbutylphenol) sulfone (ni/sulfur ratio 1.7/1) instead of the chromium imidazoline. In the table, the letter A following the example number denotes that the fabrics were prepared from blends containing the chromium imidazoline and B that the fabrics were from blends containing the nickel phenolate.

TABLE VIII

| Example No. | Structural formula of dye molecule | Color | | Color Stability after Fadeometer Exposure for | | |
|---|---|---|---|---|---|---|
| | | General | Munsell Value (H V/C) | 20 Hours | 40 Hours | 60 Hours |
| 41A | (COOH-phenyl-N=N-pyrazole with CH3, HO, N-phenyl) | Yellow | 5Y 8/9 | 3 | 2 | 2 |
| 41B | | do | 2.5Y 8/12 | 5 | 5 | 5 |
| 42A | (NO2-phenyl(OH)-N=N-pyrazole with CH3, HO, N-phenyl) | Bluish pink | 2.5R 7/8 | 3 | 2 | 1 |
| 42B | | Orange | 7.5R 6/10 | 5 | 4 | 3 |

TABLE VIII

| Example No. | Structural formula of dye molecule | Color | | Color Stability after Fadeometer Exposure for | | |
|---|---|---|---|---|---|---|
| | | General | Munsell Value (H V/C) | 20 Hours | 40 Hours | 60 Hours |
| 43A 43B | 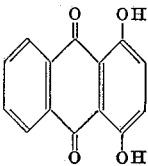 | Gun metal blue Deep garnet | 2.5PB 3/3 10R 3/2 | 5− 3+ | 4 3 | 3+ 3− |
| 44A 44B | | Pale garnet Light brown | 5R 5/4 2.5YR 5/8 | 4 4+ | 4 4− | 3 3 |
| 45A 45B | | Medium brown do | 7.5R 3/4 10R 5/10 | 4+ 4 | 4 4 | 4 3+ |
| 46A 46B | 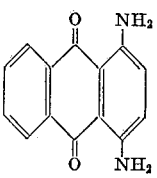 | Black brown Medium brown | 5R 4/2 2.5YR 3/8 | 5 4+ | 4 4 | 4 3 |
| 47A 47B | | Medium blue Blue | 7.5PB 4/8 5PB 3/6 | 4 5 | 3 4 | 3 4− |

The dyes that can be employed in dyeing any of the polymers described herein are those selected dyes of low water solubility having the ability to penetrate or diffuse into the polymer from a dispersion of dye particles in an acidified aqueous dye bath and the ability to be insolubilized within the polymer by forming stable complexes with the complex chromium salts of this invention. In view of these characteristics, the selected dyes of this invention are termed "disperse-mordant" dyes to distinguish them from conventional mordant dyes which are water soluble and which are incapable of diffusing into stereoregular polyolefins. Suitable dyes include the anthraquinone and monoazo dyes characterized by the presence therein of substituent groups which form insoluble stable complexes with polyvalent metal mordanting agents, by the absence of substituent groups which impart substantial water solubility to said dye, such as sulfonic acid substituent groups, and by small compact molecular size.

Some typical dye structures meeting these requirements are exemplified by the following structural formulas. However, the invention is not limited to these.

(1) 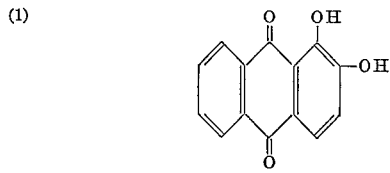

(2) 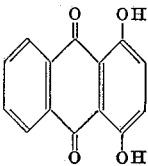

(3) 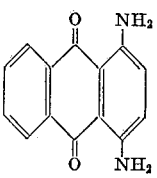

(4) 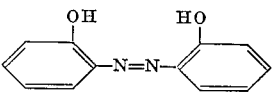

(5) 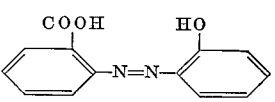

(6) 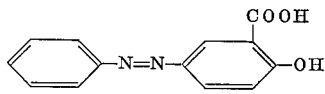

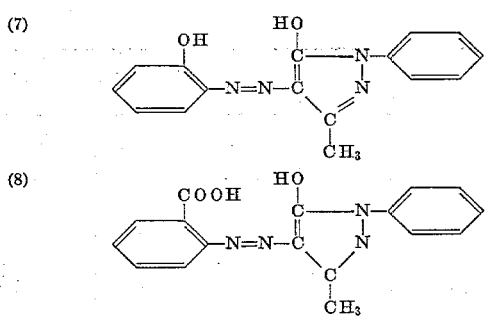

In structural Formulas 4 to 8, inclusive, naphthalene rings may be substituted for the benzene rings shown.

It will be seen that suitable anthraquinone dyes have hydroxyl groups in the 1,2-positions, as depicted by Formula 1 above, or hydroxyl or $NH_2$ groups in the 1,4-positions, as in Formulas 2 and 3 above. It will be seen that azo dyes in accordance with this invention have a hydroxyl group on a carbon atom adjacent to a carbon atom attached to an azo group, as in Formulas 4, 5, 7, and 8, or a hydroxyl group on a carbon atom adjacent to a carbon atom attached to a carboxyl group, as in Formula 6. Suitable dyes may also have, permissibly, but not necessarily, one or more of the following substituent groups attached to the dye molecule: alkyl, hydroxyalkyl, alkoxyl, hydroxyl, nitro, halo, acetamido, or sulfonamido groups.

The amount of dye employed can be varied as desired from as little as 0.1%, or less, based on fiber weight, to as much as 5% or more, depending largely on the depth of color desired, it being apparent that depth of color increases with increasing amount of dye employed.

The stereoregular polymers of this invention in the form of film, fiber, filament, thread, yarn, cord, or fabric woven from such fibers, having the complex chromium salt uniformly dispersed therein, are given a preliminary conventional scouring treatment in an aqueous detergent or soap bath to remove residual spinning, molding, and weaving lubricants and sizing agents prior to dyeing. The thus prepared film or fiber is then immersed wet in the dye bath containing a dispersion of dye particles of the selected dye and a conventional wetting agent, usually at room tmeperature. The dye bath is then brought to the boiling point and held at the boiling point, preferably with agitation, until the desired dye shade has been attained, after which the dyed fibers or film are rinsed, given a post-dyeing conventional scouring treatment in an aqueous detergent or soap bath to remove any dye particles adhering loosely to the surfaces, and then dried. It is apparent, therefore, that the mechanics of the dyeing operation, per se, apart from selection of dyestuff, follow more or less conventional dyeing practice.

From the foregoing, it is apparent that stereoregular polymers of $\alpha$-olefins having 2 or more carbons may be modified in accordance with this invention to impart light stability and dye affinity to the polymers as well as to any fiber, film, or other shaped object made from these polymers.

What I claim and desire to protect by Letters Patent is:

1. A stereoregular polymer of a mono-$\alpha$-olefin having at least 2 carbons contains containing, based on the weight of the polymer, about 0.1 to about 5% of a complex salt of chromium having the general formula $Cr(ligand)_m X_n$, wherein the ligand function is selected from the group consisting of (1) cyclic compounds containing a single hetero atom which is a tertiary nitrogen atom and (2) organic compounds containing at least 2 atoms selected from the group consisting of nitrogen and oxygen, at least 1 of said 2 atoms being nitrogen, said atoms being separated from each other by at least 1 carbon atom, X is an anion, $m$ is an integer from 1 to 3, and $n$ is a number $3/v$ where $x$ equals the valence of said anion.

2. The composition of claim 1 in which the polymer is polypropylene.

3. The composition of claim 1 also containing, based on the weight of the polymer, from about 0.01 to about 5% of a phenolic antioxidant selected from the group consisting of polyalkylphenols, alkylidene bis(alkylphenol)s, bis(alkylphenol) sulfides, 2(2'-hydroxyphenyl)-2,4,4 - polyalkylchromans, 4(2'-hydroxyphenyl) - 2,4,4-polyalkylchromans, and adducts of an alkylphenol and a cyclic terpene.

4. The composition of claim 2 in which the complex chromium salt is bis[1-(2 - hydroxyethyl) - 2 - undecyl-2-imidazoline] chromium (III) acetate.

5. The composition of claim 2 in which the complex salt of chromium is bis[N-(2-hydroxyethyl)ethylenediamine] chromium (III) acetate bis(2-ethylhexanoate).

6. The composition of claim 2 in which the complex salt of chromium is bis(ethylenediamine) chromium acetate bis(2-ethylhexanoate).

7. The composition of claim 2 in which the complex salt of chromium is bis[N-methyl-bis(3-aminopropyl) amine] chromium acetate bis(2-ethylhexanoate).

8. The composition of claim 2 in which the complex salt is 1,10-diamino-4,7-dioxadecane chromium acetate bis(2-ethylhexanoate).

9. The composition of claim 2 in which the complex salt is triethanolamine chromium acetate bis(2-ethylhexanoate).

10. The composition of claim 2 in which the complex salt is bis(N-methyl ethanolamine) chromium acetate bis(2-ethylhexanoate).

11. A stereoregular polymer of propylene containing, based on the weight of the polymer, about 0.1 to about 5% of bis[1-(2-hydroxyethyl) - 2 - undecyl - 2 - imidazoline] chromium (III) acetate and about 0.1 to about 5% of a mixture of isopropylidene-bis(nonylphenol) and 2-(2'-hydroxyphenyl) - 2,4,4 - trimethyl-5,6-dinonylchroman.

References Cited by the Examiner

UNITED STATES PATENTS 3,148,936   9/1964   Turbak _____ 260—45.75

LEON J. BERCOVITZ, *Primary Examiner.*

G. W. RAUCHFUSS, JR., *Assistant Examiner.*